J. VOM HOFE.
FISHING REEL.
APPLICATION FILED SEPT. 11, 1909.

987,628.

Patented Mar. 21, 1911.

Witnesses:
Edward Bowland
M. F. Keating

Inventor
Julius vom Hofe
By Attorney
Charles J. Kintner

UNITED STATES PATENT OFFICE.

JULIUS VOM HOFE, OF NEW YORK, N. Y.

FISHING-REEL.

987,628. Specification of Letters Patent. Patented Mar. 21, 1911.

Application filed September 11, 1909. Serial No. 517,270.

*To all whom it may concern:*

Be it known that I, JULIUS VOM HOFE, a citizen of the United States, and resident of New York, borough of Brooklyn, county of Kings, and State of New York, have made a new and useful Invention in Fishing-Reels, of which the following is a specification.

Figure 1:
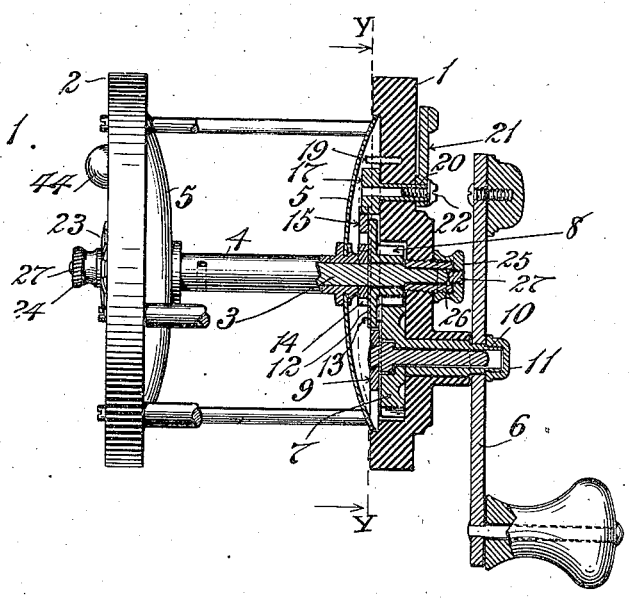
Figure 3:
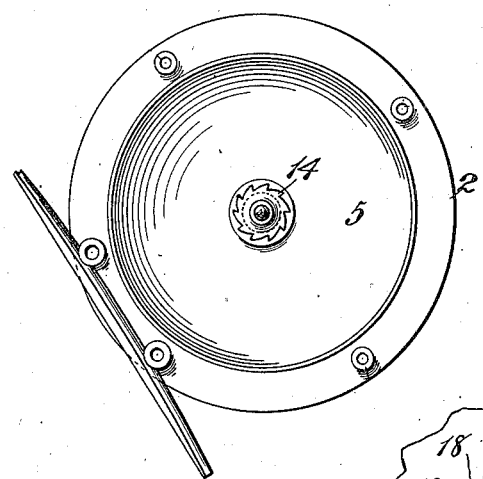
Figure 2:
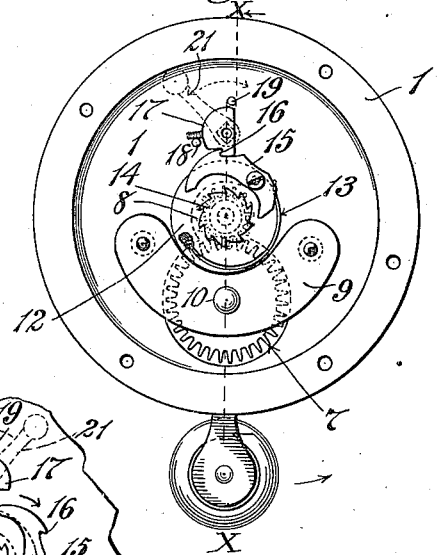
Figure 4:
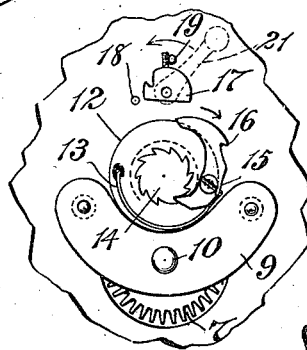

My invention is directed particularly to improved appliances for disconnecting the spool of a fishing reel from the driving gear therefor so as to allow the line to run free when casting, the teeth of the driving gear and its driven pinion being always in full mesh and the location of the shafting never varied in any sense after it is put in place, as will be fully understood by referring to the accompanying drawings, in which, Figure 1 is a part side elevational view of a reel illustrating my improvement as applied thereto in sectional view and as taken on the line X—X Fig. 2 and seen looking from right to left in the direction of the arrows. Fig. 2 is an end elevational view as seen looking at the right hand head of the reel shown in Fig. 1 upon the plane Y—Y and in the direction of the arrows from left to right. Fig. 3 is an end elevational view of Fig. 1 as seen looking at the reel from right to left and after the right-hand head shown in Fig. 2 has been removed, and upon the supposition that the spool is disconnected from the driving gear; and Fig. 4 is a similar view of the like parts upon the supposition that the spool is connected to the driving gear, the outer rim of the head, however, in this view being broken away.

Referring now to the drawings in detail in all of which like numerals of reference represent like or equivalent parts wherever used, 1 and 2 represent respectively the heads of the reel made preferably of hard rubber and held together in the usual way by a plurality of bars or rods, 3 being a shaft journaled in proper journal bearings in these heads.

4 constitutes the sleeve and 5, 5, the heads of the spool, said sleeve and heads being connected directly to the shaft in the usual way.

6 constitutes the usual well known form of balanced driving crank, 7 a main driving gear and 8 a pinion geared therewith for driving the spool.

9 represents a curvilinear standard secured to the head at two points and constituting at its center a bearing for the shaft 10 which carries the main driving gear 7.

11 represents a detachable nut for securing the handle 6 in place upon the shaft 10.

The parts so far described are of well known construction and in general public use.

My improvement embraces means whereby the spool of the fishing reel may be operatively connected to and disconnected from the driving gear through the agency of clutching means, part of which rotates with the gearing, while the other parts thereof are operatively connected with the head of the reel and adapted to be moved into and out of operative relation with the rotatable parts, the arrangement being such that all of the individual gear-wheels of the gearing mechanism remain always permanently in full mesh and are never shifted in the slightest degree in a longitudinal direction, such an arrangement making it impossible to in any manner disturb the delicate relation of the train of gearing and to thereby maintain the permanently adjusted relation of such gearing always in the best possible running relation.

It has heretofore been customary to effect the interconnection and disconnection of the spool with the driving gear either by withdrawing the teeth of the latter tangentially from the teeth of the pinion, or by drawing the pinion in the direction of the axis of the spool until the teeth slide out of mesh either partially or wholly. In the use of reels of this nature the teeth of the gearing often become, while casting, seriously damaged, and it was with a view of overcoming this damaging effect upon the delicate gearing teeth that my improvement in this respect was devised. For the purpose of effecting this result I retain the teeth of the gearing 7 and intermeshing pinion 8 always in full mesh intergeared relation with each other and I so construct said pinion that it is provided with a circular disk 12 carrying near its outer edge a pivoted dog 15, which dog is provided at one end with a hook or detent 16 and at the other with a pawl adapted to be held, when in a depressed position, by a spring 13 carried by the disk against any one of the teeth of a ratchet-wheel 14 which is permanently connected to the shaft 3, these parts constituting rotatable clutching means. 17 is a cam-shaped sector journaled upon a shaft 20 in the head 1 and provided with an operating handle 21 secured thereto by a screw 22. This sector has a tooth at one edge adapted to receive the hook or detent 16, and it is provided also on its face with a pin adapted to permit it to assume either one of two positions, against a pin 18 or corresponding pin 19, 90° distant, dependent upon the position of the handle 21, as shown in dotted lines Fig. 2, said parts constituting means for operatively connecting the parts of the rotatable clutching means and disconnecting said parts from the spool of the reel. 26, 26 are adjustable sleeve-like journal bearings for the shaft 3.

23 is a curvilinear spider like yielding washer which surrounds a screw-threaded sleeve secured in the head 2, said sleeve acting as a journal bearing for one end of the shaft 3, and 24 is a screw-cap adapted to be secured upon the outer end of this sleeve. 25 is a similar screw-cap adapted to be secured upon a like sleeve on the other end of the reel, which sleeve constitutes the other journal bearing.

27, 27 are set-screws for varying the axial position of the shaft 3.

The operation of my improved reel is as follows, upon the supposition that the spool is connected with the driving gear the handle 21 being in the position shown in Fig. 4. Under this condition the free end of the spring 13 presses the toe of the pivoted dog into operative connection with one of the teeth of the ratchet-wheel 14 so that the spool, and hence the line, is connected directly to the train of gearing and the line may be reeled in at pleasure, the parts 13, 14, 15 and 16 constituting an interconnecting rotatable clutch and the part 17 and handle 21 means for applying or releasing such clutch. Suppose now it is desired to cast, the user simply turns the handle 21 into the opposite position, that is to say, into the position shown in dotted lines Fig. 2, under which condition the sector 17 assumes the position shown and the dog 15 is tilted against the action of the spring 13 so as to release the toe thereof from the ratchet-wheel 14; consequently, the spool is now disconnected and the user may cast at will, the gearing mechanism being always in full mesh and the handle 6 standing idle because of the locked relation of the parts 15 and 16. When it is again desired to connect the spool to the driving gear, it is first necessary to rotate the reel driving handle 6 backward sufficiently to release the dog 15, after which the handle 21 is rotated into the position shown in Fig. 4 and the line may then be reeled in. Therefore, it will be seen that with this structural form the gears are never varied in their relation and that there is little danger of the same being in any way damaged, in view of the fact that the interconnections between the spool and such gearing is effected by the agency of means in the nature of clutching mechanism so constructed as to bring about the desired result without in any sense disarranging such delicate gearing.

I am aware that a fishing reel has heretofore been devised in which a free running spool is operatively driven by a train of gearing which is always in full mesh and in which the method of operating the same is made dependent upon sliding clutching mechanism moving longitudinally in the direction of the axis of the reel, and I make no claim hereinafter broad enough to include such a structural device, my invention being directed particularly to rotatable clutching means adapted to be operatively connected to and disconnected from the driving and the driven parts, through the agency of means readily accessible to the user.

Having thus described my invention what I claim and desire to secure by Letters Patent of the United States is—

In a fishing reel a train of driving gear which always remains in full driving mesh; a driving crank operatively connected thereto; a rotatable spool supported by a driving shaft; a clutch embracing a ratchet-wheel carried by the shaft and a pivoted dog operatively connected to and adapted to rotate with the driving gear; in combination with a cam-shaped sector journaled upon a shaft and operatively connected with an operating handle secured in the head of the reel; the sector being provided with means for limiting its movement in opposite directions and with a detent or hook for locking the dog out of operative section with the teeth of the ratchet-wheel; together with means for forcing one end of the dog into operative relation with the teeth of said wheel when the sector is rotated into its inoperative position, substantially as described.

In testimony whereof I have signed my name to this specification in the presence of two subscribing witnesses.

JULIUS VOM HOFE.

Witnesses:
C. J. KINTNER,
M. F. KEATING.